UNITED STATES PATENT OFFICE.

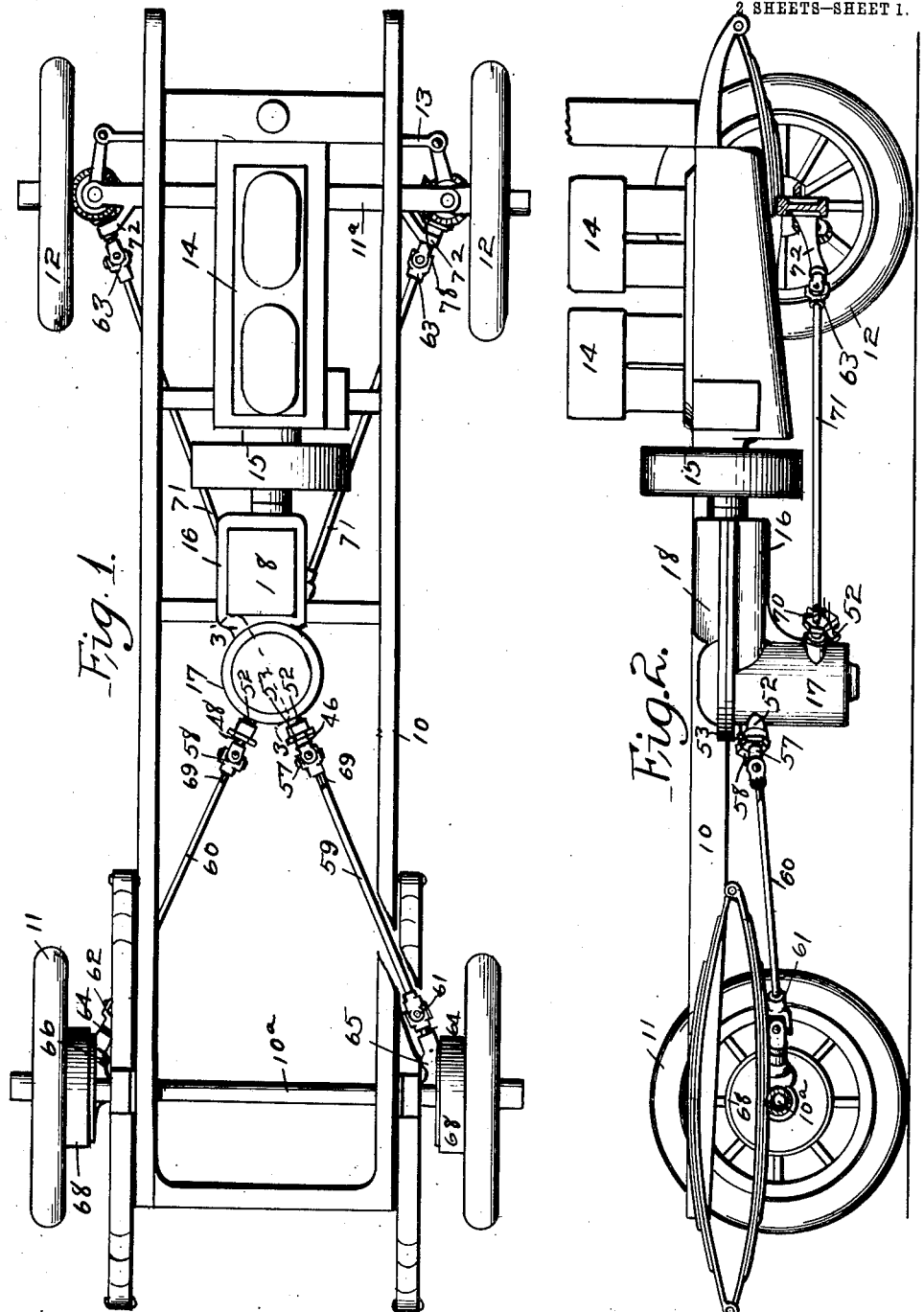

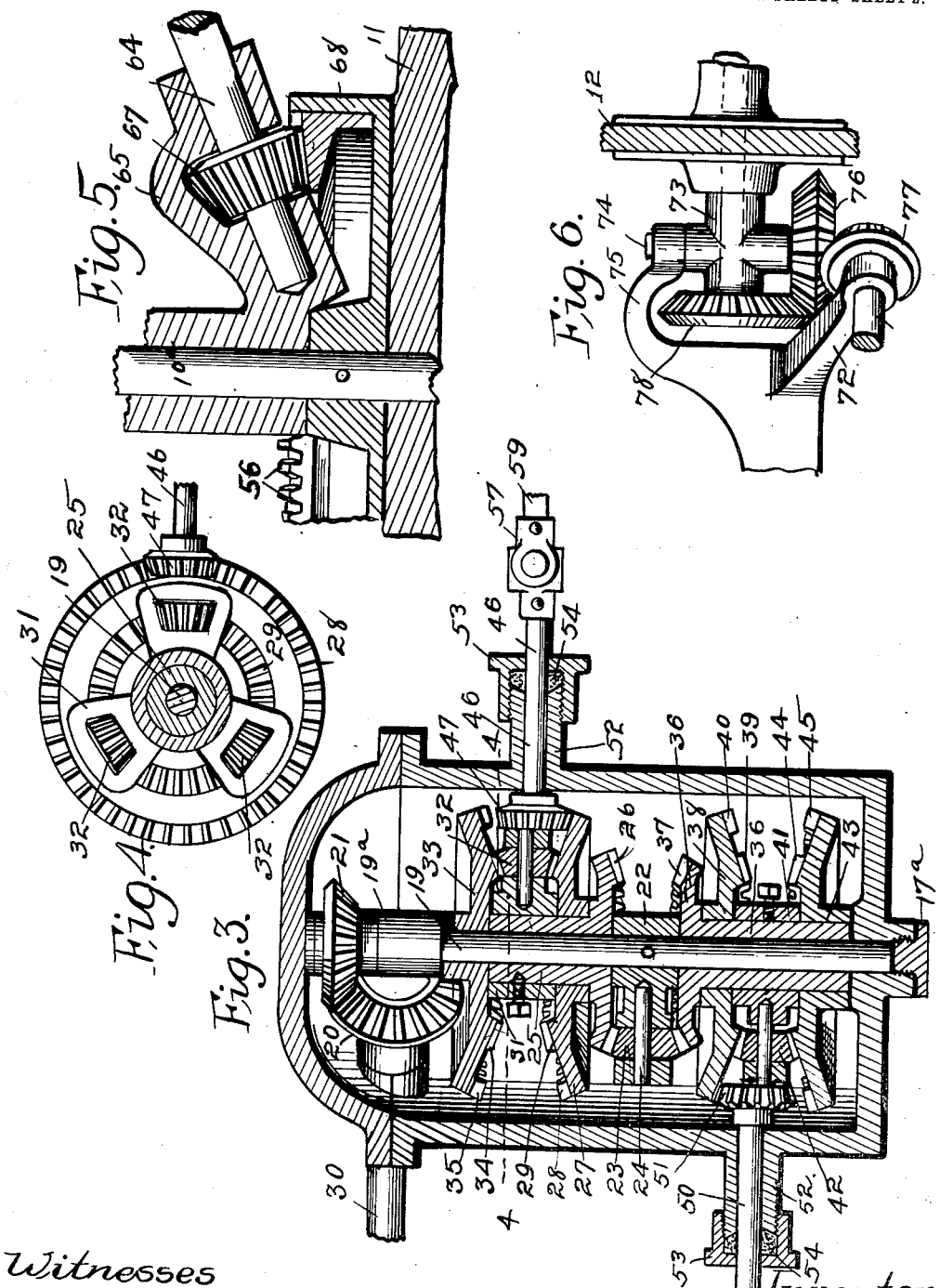

EUGENE HAROLD AVERY, OF BRADGATE, IOWA.

GEARING FOR MOTOR-VEHICLES.

1,074,341.  Specification of Letters Patent.  Patented Sept. 30, 1913.

Application filed October 19, 1911. Serial No. 655,548.

*To all whom it may concern:*

Be it known that I, EUGENE HAROLD AVERY, a citizen of the United States, residing at Bradgate, in the county of Humboldt and State of Iowa, have invented a certain new and useful Gearing for Motor-Vehicles, of which the following is a specification.

My invention relates to that class of self-propelled vehicles, in which power from an engine is transmitted to all four wheels.

It is my object to provide suitable mechanism in a vehicle of this kind by which power is transmitted from a single power shaft to all four of the vehicle wheels by simple, direct and effective means.

A further object of my invention is to provide a transmission gearing in a vehicle of the class described wherein the differential gears for both front and rear axles are located on such power shaft and not on the axles.

A further object is to provide in such a vehicle a single power shaft on which are three differentials designed to allow for variations in the speed between front and back wheels and between two front wheels and the two back wheels.

A further object is to provide a transmission gear for motor vehicles adapted to drive all four wheels so located and constructed that such gear may be contained in a single gear casing which gear casing may be filled with oil.

A further object is to provide in such a machine suitable means for transmitting power to the front wheels in such a way that the steering mechanism will not be interfered with.

More particularly, my object is to provide a transmission gearing for motor vehicles, the main parts of which are located on or adjacent to a single power shaft.

My invention consists in the construction, arrangement and combination of the various parts of the device whereby the objects contemplated are attained, as hereinafter more fully set forth, pointed out in my claims and illustrated in the accompanying drawings, in which Figure 1 shows a plan view of the chassis of a motor driven vehicle, equipped with a transmission gear embodying my invention. Fig. 2 shows a side elevation of the same. Fig. 3 shows a detail, central, vertical sectional view through the gear casing and the mechanism contained therein, taken on the line 3—3 of Fig. 1. Fig. 4 shows a sectional, detail view on the line 4—4 of Fig. 3, the casing being removed. Fig. 5 shows a detail, sectional view showing means for transmitting power to the rear wheels. Fig. 6 shows a detail view of the means for transmitting power to the front wheels.

In the accompanying drawings, I have used the reference numeral 10 to indicate the frame of the automobile chassis. A rear axle $10^a$ and a front axle $11^a$ are mounted on said frame and wheels 11 are mounted on the axle $10^a$. Front wheels 12 are mounted on the frame in the manner which will hereinafter be explained.

The numeral 13 indicates the steering gear. Mounted on the chassis is an engine 14 of any desired construction. Mounted on the engine shaft adjacent to the engine is a balance wheel 15. Rearwardly in the machine from the balance wheel is a casing 16 containing a counter shaft and portion of the engine shaft and ordinary sliding gears whereby the speed of the vehicle with relation to the speed of the engine is varied. Formed integral with the casing 16 is a casing 17 designed to receive and inclose my improved transmission gear. The casings 16 and 17 are provided with a detachable top 18 which covers both casings as shown in Fig. 2. The lower portion of the casing 17 is closed except for the openings hereinafter mentioned in order that said casing may be filled with oil in which the transmission gear runs. Vertically mounted within the casing 17 is a power shaft 19 which runs in bearings formed at the upper and lower ends of the casing 17. Below the bearing at the lower end of said casing is a screw threaded cap $17^a$ which may be removed for cleaning the casing and other purposes. Mounted near the upper end of the shaft 19 is a cylindrical block $19^a$ above which is fixed a beveled gear 21. The engine shaft 30 enters the casing 17 near the upper end thereof and has on its end a beveled gear 20 in mesh with the beveled gear 21. Centrally fixed on the shaft 19 within the casing 17 is a sleeve 22 in which are rotatably mounted vertical beveled gears 23 preferably three in number.

The beveled gears 23 are shown mounted on short shafts 24.

Rotatably mounted on the shaft 19 above the sleeve 22, is a sleeve 25 having formed on its lower surface a horizontal beveled gear 26 in mesh with the beveled gears 23. Rotatably mounted on the sleeve 25 above the beveled gear 26 is a sleeve 27 on the upper surface of which are formed concentric beveled gears 28 and 29. Rigidly mounted on the sleeve 25 above the sleeve 27 is a sleeve 31 similar in form to the sleeve 22. Rotatably mounted in the sleeve 31 are vertical beveled gears 32 preferably three in number in mesh with the horizontal beveled gear 29. Above the sleeves 25 and 31 is a sleeve 33 rotatably mounted on the shaft 19 and held in position between the sleeve 25 and the block 19$^a$. On the lower surface of the sleeve 33 are formed horizontal beveled gears 34 and 35. The beveled gear 34 is in mesh with the vertical beveled gears 32 in the sleeve 31. Below the sleeve 22 rotatably mounted on the shaft 19 is a sleeve 36 on the upper surface of which is formed a horizontal, beveled gear 37 in mesh with the beveled gears 23 in the sleeve 22. Rotatably mounted on the sleeve 36 just below the beveled gear 37 is a sleeve 38 on the lower surface of which are formed the beveled gears 39 and 40. Fixed to the sleeve 36 below the sleeve 38 is a sleeve 41 similar to the sleeves 31 and 22 in which are rotatably mounted vertical beveled gears 42, preferably three in number in mesh with the horizontal beveled gear 39. Below the sleeve 41 and rotatably mounted on the sleeve 36 is a sleeve 43 on the upper surface of which are formed horizontal beveled gears 44 and 45. The beveled gear 45 is in mesh with the beveled gears 42 in the sleeve 41. Extending through the wall of the casing 17 and rotatably mounted in said wall is a shaft 46 designed to connect with the drive shaft extending to one of the rear wheels. On the inner end of the shaft 46 is a beveled gear 47 in mesh with the beveled gear 28. A similar shaft 48 extends through the wall of the casing 17 and has on its end a beveled gear not shown, in mesh with the beveled gear 35. A shaft 50 designed to be connected with the drive shaft to one of the front wheels extends through the casing 17 and has on its end a beveled gear 51. A similar shaft not shown connected with the drive shaft to the other front wheel extends through the casing 17 and has on its end a beveled gear similar to the beveled gear 51 in mesh with the beveled gear 45.

Formed on the casing 17 are extensions 52 which form bearings for the shafts 46, 48 and 50, and the other shaft similar to the shaft 50. On the ends of the extensions 52 are secured caps 53 between which and the extensions 52 I provide suitable packing material 54. On account of the construction of the extensions 52 and adjacent parts, contained within the casing 17 form three tially oil tight and may be filled with oil in which the gears travel.

It will be seen that the parts described as contained within the casing 17 form three differentials mounted on a single shaft. It is believed it is unnecessary to explain in detail the work of these differentials since their working is easily understood from the working of any ordinary differential. The sleeve 22 and the gears thereon in connection with the sleeves 25 and 36 and the mechanism connected therewith forms the differential between the front wheels and the back wheels. The sleeves 27, 31 and 33 and the mechanism connected therewith form a differential between the two back wheels. The sleeves 38, 43 and 41 form the differential between the two front wheels. It will be noted in this connection that each of the drive shafts for the various wheels is driven practically directly from the power shaft.

On the inside of each of the rear wheels, is formed a vertical beveled gear 56. Connected with the shafts 46 and 48 by means of universal joints 57 and 58 are drive shafts 59 and 60 which extend to positions adjacent to each of the rear wheels where they are connected by universal joints 61 and 62 with short shafts 64 which are rotatably and non-slidably mounted on the rear axle. Fixed on the shafts 64 within bearings 65 and 66 are beveled gears 67 in mesh with the beveled gears 56 on the rear wheels. On the rear axles are band brakes 68. The shafts 59 and 60 and 71 hereinafter described are provided with square heads 69 which are slidably received in recesses in the universal joints 57 and 58 and 70 hereinafter mentioned and are designed to permit slight longitudinal movement of said shafts 59, 60 and 71.

Connected with the shaft 50 by means of a universal joint 70, is a shaft 71 extending to a point adjacent to one of the front wheels and mounted in a bearing 72 on the front axle. In the shaft 71 is a universal joint 63. The front wheels are mounted on stub axles shown by the dotted lines in Fig. 6 which are rotatably mounted in bearings 73 which bearings are pivotally mounted by means of shafts 74 in brackets 75 on the front axle. Rotatably mounted near the lower end of the shaft 74 is a double, faced beveled gear 76 having its lower face in mesh with a beveled gear 77 on the shaft 71 and having its upper face in mesh with a beveled gear 78 on the inner end of the stub axle. The front wheels 12 are fixed on said stub axles. The construction of the mechanism for imparting motion to the front wheels is the same for both wheels. It will be noted from the description hereinbefore set forth that the front wheels may move laterally on the shafts 74 in which case the beveled gear 78 will travel on the beveled gear 76 without interfering in any way with said lateral motion.

I will now describe the practical operation of my improved transmission gearing for automobiles. I assume that the engine is operated in the ordinary way and that the steering mechanism is of ordinary construction. When the automobile is in motion, assuming the load on the front wheels and back wheels to be equal, the rotation of the shaft 19 will cause the rotation of the sleeve 22. The beveled gears 23 in the sleeve 22 will engage the beveled gears 26 and 37 with equal force and the sleeves 25, 31, 33, 36, 43 and 41 will all be rotated equally. If, however, the load on the back wheels is heavier than the load on the front wheels, the beveled gears 23 will travel faster over the beveled gear 37 than over the beveled gear 26. Thus in turning a corner, ordinarily the front wheels travel the longer distance while the back wheels carry the greater load. In the illustration now under consideration, the fact that the beveled gears travel more rapidly upon the beveled gear 37 than upon the beveled gear 26 causes the front wheels to travel more rapidly than the rear wheels. The upper and lower differentials operate in the same way as between the two rear wheels and the two front wheels.

It is believed that the transmission gear hereinbefore described has many decided advantages. Drive shafts for running all four wheels are driven directly from a single power shaft. This is believed to accomplish the transmission of power with a minimum of loss. On the power shaft are mounted three differential mechanisms whereby differentials are established between the front and rear wheels and between the two front and two rear wheels. The adjustment is secured on a single shaft and it is believed that this form of transmission is original and novel. The transmission gear is so located and constructed that it may be contained within a single casing and can run in oil therein. The saving of wear and expense accomplished in this way is very great. It is believed that the arrangement of the differentials on the same shaft and the means for driving the drive shafts directly from the differentials, effect a great saving in wear and power. It is also believed to be advantageous to place the transmission and differential gears near the engine instead of farther therefrom. This effects an economy of wear and power. In summary, I locate my differentials and transmission gearing near the engine in compact form within a single casing, where the gears may run in oil.

My device is especially designed for use with power trucks and with auto vehicles adapted to farm traction purposes. For a vehicle of this kind, transmission of power to all four wheels is desirable. Especially in a farm traction vehicle of the type mentioned, it is desirable to have few and simple parts. My parts are as few in number as they can well be to accomplish the purpose and are not of complicated construction. By arranging them within a single casing where they can run in oil, their durability is very largely increased.

It will be noted that the arrangement of my drive shafts with relation to the front wheels is such that there is no interference with the steering mechanism.

I claim as my invention—

1. In a device of the class described, an upright shaft, means for operatively connecting the upper end of said shaft with an engine shaft, upper, middle and lower differential gears mounted on said shaft, the middle gear being operatively connected with said shaft and with said upper and lower differential gears, and having a differential motion with relation to the upper and lower differential gear, a gear casing inclosing said differentials and said upright shaft and forming bearings for the latter, two short shafts mounted in said casing near the upper differential, said short shafts being operatively connected with the upper and lower gears respectively of the upper differential, two short shafts mounted in said casing near the lower differential, said last named short shafts being operatively connected respectively with the upper and lower gears of said lower differential gear, said short shafts being mounted in substantially oil tight bearings and said casing being designed to contain oil in which said differentials run.

2. In a device of the class described, a vertical power shaft, a middle differential gear operatively mounted thereon, upper and lower differential gears mounted on said shaft and operatively connected with said middle differential gear, short shafts operatively connected respectively with the upper and lower gears of the upper and lower differential gears, driven-shafts, joints connecting said short shafts with said respective driven shafts, said driven shafts being composed of two parts capable of longitudinal, sliding movement with relation to each other.

EUGENE HAROLD AVERY.

Witnesses:
M. R. Higby,
D. R. Burge.